United States Patent [19]

Ochiumi

[11] Patent Number: 4,842,918

[45] Date of Patent: * Jun. 27, 1989

[54] THERMOPLASTIC HALOCARBON POLYMER LAMINATES

[75] Inventor: Masahide Ochiumi, Yokkaichi, Japan

[73] Assignee: Mitsubishi Petrochemical Co., Ltd., Tokyo, Japan

[*] Notice: The portion of the term of this patent subsequent to Jun. 7, 2005 has been disclaimed.

[21] Appl. No.: 129,760

[22] Filed: Dec. 7, 1987

[30] Foreign Application Priority Data

Dec. 10, 1986 [JP] Japan .................................. 61-292299

[51] Int. Cl.$^4$ .......................... B32B 7/02; B32B 15/08
[52] U.S. Cl. ..................................... 428/215; 428/349; 428/421; 428/424.6; 428/413
[58] Field of Search ............... 428/421, 516, 215, 349, 428/424.6, 413

[56] References Cited

U.S. PATENT DOCUMENTS

| | | | |
|---|---|---|---|
| 4,317,860 | 3/1982 | Strassel | 428/421 |
| 4,585,701 | 4/1986 | Bartoszek et al. | 428/421 |
| 4,588,642 | 5/1986 | Ochiumi | 428/421 |
| 4,677,017 | 6/1987 | De Antonis et al. | 428/421 |
| 4,749,607 | 7/1988 | Ochiumi | 428/516 |

Primary Examiner—Edith Buffalow
Attorney, Agent, or Firm—Oblon, Spivak, McClelland, Maier & Neustadt

[57] ABSTRACT

A thermoplastic halocarbon polymer laminate is described. The laminate comprises a modified vinylidene halide polymer containing at least one functional group (a) selected from the group consisting of a carboxyl group, a hydroxyl group, and an epoxy group and a modified styrene polymer containing at least one functional group (b) which is selected from the above-defined group but which differs from the functional group (a), with the contents of the functional groups (a) and (b) being $1 \times 10^{-3}$ to $3 \times 10^{-1}$ mol/100 g respectively.

The laminate of the present invention is high in interlaminar adhesion and has the advantageous properties of thermoplastic halocarbon polymers as well as the properties of styrene polymers.

8 Claims, No Drawings

THERMOPLASTIC HALOCARBON POLYMER LAMINATES

FIELD OF THE INVENTION

The present invention relates to laminates having a strong interlaminar adhesion that include a layer of a thermoplastic halocarbon polymer.

BACKGROUND OF THE INVENTION

Of thermoplastic halocarbon polymers, fluorocarbon polymers generally have superior resistance to solvents and absorb no water at all. In addition, fluorocarbon polymers are quite excellent in weather resistance, heat durability, abrasion resistance, and nonstickiness of all plastics.

Polytetrafluoroethylene (PTFE) is a typical fluorocarbon polymer. Because of its high resistance to heat and solvents, PTFE is used as an anticorrosive coating on the inner surfaces of pipes and as packings in chemical apparatuses. Since PTFE has a low dielectric constant, a low dielectric loss, and a high electrical resistivity, it is used as an insulator on electric cables. PTFE is also used for oilless retainer and guide shoe because it is excellent in surface lubricity. However, since PTFE has a high melting point and cannot be easily molded by melt-forming techniques, disadvantageously PTFE must usually be formed by sintering procedures. With a view to improving the moldability of PTFE, copolymers of tetrafluoroethylene with other unsaturated monomers or fluorocarbon monomers other than tetrafluoroethylene have been proposed. Furthermore, non-tetrafluoroethylene type fluorocarbon polymers which are thermoplastic and yet exhibit properties similar to those of PTFE have been developed.

Despite their superior properties, PTFE and the improved fluorocarbon polymers are expensive and for general purposes it is considered useful that they are laminated with inexpensive substrates.

The problem, however, is that fluorocarbon polymers are non-adhesive and involve considerable difficulty in terms of being bonded to substrates.

A variety of techniques have been studied in order to provide fluorocarbon polymers with improved adhesion to substrates. One approach is to modify the surfaces of fluorocarbon polymers either by the wet process wherein the surfaces of molded fluorocarbon polymers are treated, for example, with a solution of an alkali metal or by dry processes such as corona discharge, plasma discharge and sputter etching. According to other approaches, the surface of a fluorocarbon polymer is eroded by a special solvent that can dissolve the polymer and is bonded to substrates; alternatively, a fluorocarbon polymer is physically bonded to substrates by sandwiching a glass mat.

Adhesive polymers that can be used as substrates to be bonded to fluorocarbon polymers have also been proposed. There are known, for example, certain ethyleneethyl acrylate copolymers, ethylene-vinyl acetate copolymers, and modified products thereof (see Japanese Patent Application Laid-Open Nos. 86748/81 and 12645/82); epoxy group-containing polyolefins (see Japanese Patent Application Laid-Open Nos. 8155/82 and 212055/82); and polymer compositions comprising methyl methacrylate polymers and copolymers grafted with vinylidene fluoride (see Japanese Patent Application Laid-Open No. 12646/82).

Chlorocarbon polymers as thermoplastic halocarbon polymers are generally flame-retardative, have superior resistance to water, acids and alkalis, are stable in many organic solvents, and exhibit superior barrier properties against various gases and water vapor. Vinyl chloride polymer (PVC) and vinylidene chloride polymer (PVDC) are typical chlorocarbon polymers.

Vinylidene chloride homopolymer has a softening point which is very close to the thermal decomposition temperature and the plasticizers and stabilizers that can be used with this polymer are limited. Therefore, in order to provide PVDC having improved moldability, vinylidene chloride is copolymerized with such monomers as vinyl chloride, acrylonitrile and acrylates. Such copolymers (PVDC) are used in textile products such as fishing nets, insect-screen nets, and tents, as well as in packing films, and coating latices. PVDC has superior gas barrier properties but it is expensive and does not exhibit satisfactory degrees of heat resistance and stiffness when used alone. Therefore, in the food packing industry, PVDC is used in the form of dispersion coatings or, alternatively, it is laminated with substrates, for example, of styrene type resins by coextrusion molding, and they are used for films and containers. In the case of containers, a dispersion of PVDC is difficult to apply and requires a drying process. In order to avoid this complexity of operations, it is desirable to fabricate PVDC containers by the simpler coextrusion molding rather than the dispersion coatings.

PVDC is not highly adhesive and attempts have been made to improve the adhesive properties of its dispersion to the substrates by introducing functional groups through copolymerization with other monomers.

Adhesive polymers that are suitable for use as substrate which adhere to PVDC have been proposed and they include: ethylene-vinyl acetate copolymers (see Japanese Patent Application Laid-Open Nos. 66770/74 and 26876/78; and Japanese Utility Model Application Laid-Open No. 83339/78); thermoplastic polyurethanes (see Japanese Patent Application Laid-Open Nos. 106584/79 and 217151/85); and certain polyesters (see Japanese Patent Application Laid-Open No. 152085/79).

However, these prior techniques are not completely satisfactory in terms of moldability, workability and adhesive strength and the types of substrates to which they can be bonded are limited. For example, as for fluorocarbon polymers, Japanese Patent Application Laid-Open Nos. 86748/81 and 12645/82 disclose laminates of thermoplastic fluorocarbon polymers and ethylene-vinyl acetate copolymers; if, with a view to providing improved adhesion, a large amount of vinyl acetate is introduced in the form of a copolymer with ethylene, the resulting copolymer has a lowered mechanical strength and yet its adhesive strength to the fluorocarbon polymer is not significantly improved. As for chlorocarbon polymers, most cases of coextrusion molding are laminates of PVDC and ethylene-vinyl acetate copolymers as proposed in Japanese Patent Application Laid-Open Nos. 66770/74 and 26876/78 and Japanese Utility Model Application Laid-Open No. 83339/78, but ethylene-vinyl acetate copolymer adheres poorly to styrene polymers and has not been suitable, for example, for use as industrial parts, and food packaging materials.

SUMMARY OF THE INVENTION

The inventor has made concerted efforts for the purpose of eliminating the aforementioned defects. As a result, the inventor has found that by laminating specifically modified polymers mentioned below, a laminate improved remarkably in adhesion can be obtained and the above purpose can be attained. The present invention has been accomplished on the basis of this finding.

Therefore, the present invention provides a thermoplastic halocarbon polymer laminate which comprises a modified vinylidene halide polymer containing at least one functional group (a) selected from the group consisting of a carboxyl group, a hydroxyl group, and an epoxy group and a modified styrene polymer containing at least one functional group (b) which is selected from the above-defined group but which differs from the functional group (a), with the contents of the functional groups (a) and (b) being $1 \times 10^{-3}$ to $3 \times 10^{-1}$ mol/100 g respectively.

DETAILED DESCRIPTION OF THE INVENTION

The vinylidene halide polymers used in the present invention include first, as vinylidene chloride polymers, polyvinylidene chloride, and copolymers whose major component is vinylidene chloride such as vinylidene chloride-vinyl chloride copolymer, vinylidene chloride-acrylonitrile copolymer, and vinylidene chloride-acrylate copolymer, commercial products of which may be used as required, and as vinylidene fluoride polymers, polyvinylidene fluoride and copolymers whose major component is vinylidene fluoride such as vinylidene fluoride-tetrafluoroethylene copolymer, vinylidene fluoride-chlorotrifluoroethylene copolymers, and vinylidene fluoride-hexafluoropropylene copolymer, commercial products of which may be used as required. Further, other polymers compatible with vinylidene halide polymers may be used as blends. A known example of such blends is one of a vinylidene fluoride polymer and a methyl methacrylate polymer. The vinylidene halide polymers may of course be mixed with commonly employed inorganic fillers, additives, pigments, etc.

The modified vinylidene halide polymers that constitute one layer of the laminate of the present invention are ones that are formed by introducing at least one functional group (a) selected from the group consisting of a carboxyl group, a hydroxyl group, and an epoxy group into the above-mentioned vinylidene halide polymers, which may be formed into a composition.

The functional group (a) may be introduced into the vinylidene halide polymer by a variety of methods such as; a method wherein a thermoplastic polymer having the functional group (a) and compatible with the vinylidene halide polymer is blended with the vinylidene halide polymer; a method wherein a comonomer having the functional group (a) is incorporated in the vinylidene halide polymer by either random, block or graft copolymerization; a method wherein the reactive group in the vinylidene halide polymer is reacted with a compound having the functional group (a) or a compound that will form such a functional group by reaction; and a method wherein the polymer is modified by oxidation (thermal decomposition), hydrolysis or any other appropriate means. The first, second and fourth methods are preferable, since they allow the functional group (a) to be readily introduced into the vinylidene halide polymer and because it is easy to control the amount of the functional group (a) to be incorporated.

An example of thermoplastic polymers having the functional group (a) and compatible with the vinylidene halide polymer is a copolymer of a monomer having the functional group (a) and a monomer, such as a methacrylate or an acrylate, which is compatible with the vinylidene halide polymer.

Illustrative monomer having a carboxyl group include acrylic acid, methacrylic acid, maleic acid, itaconic acid, hymic acid (3,6-endomethylene-1,2,3,6-tetrahydrophthalic acid) and their anhydrides. Acrylic acid and maleic anhydride are particularly preferable for the purpose of providing enhanced adhesion.

Illustrative monomers having an epoxy group include glycidyl acrylate, glycidyl methacrylate, glycidyl ethyl acrylate, and glycidyl itaconate. Glycidyl acrylate and glycidyl methacrylate are particularly preferable because of their high reactivity.

A hydroxyl group is preferably introduced by hydrolyzing a copolymer of a vinyl ester such as vinyl acetate or vinyl propionate or by copolymerizing an unsaturated alcohol such as an ester of acrylic acid or methacrylic acid with a glycol.

Examples of the modified thermoplastic vinylidene chloride copolymer obtained by graft, random or block copolymerization are vinylidene chloride/(meth)acrylic acid copolymer, vinylidene chloride/2-hydroxyethyl (meth)acrylate copolymer, vinylidene chloride/2-hydroxypropyl (meth)acrylate copolymer, vinylidene chloride/hydroxyvinyl ether copolymer, vinylidene chloride/glycidyl (meth)acrylate copolymer, vinylidene chloride/glycidyl vinyl ether copolymer, and vinylidene chloride/allylglycidyl ether copolymer as well as multicomponent copolymers comprising a binary monomer constituting these copolymers and a comonomer or comonomers such as vinyl chloride, an alkyl (meth)acrylate, and acrylonitrile.

Examples of the modified thermoplastic vinylidene fluoride copolymer are obtained by graft, random or block copolymerization are vinylidene fluoride/(meth)acrylic acid copolymer, vinylidene fluoride/2-hydroxyethyl (meth)acrylate copolymer, vinylidene fluoride/2-hydroxypropyl (meth)acrylate copolymer, vinylidene fluoride/hydroxyvinyl ether copolymer, vinylidene fluoride/glycidyl (meth)acrylate copolymer, vinylidene fluoride/glycidyl vinyl ether copolymer, and vinylidene fluoride/allylglycidyl ether copolymer as well as multicomponent copolymers comprising a binary monomer constituting these copolymers and a comonomer or comonomers such as tetrafluoroethylene, hexafluoropropylene, trifluorochloroethylene, vinyl fluoride, ethylene, propylene, an alkyl vinyl ether, fluorovinyl ether, a fluoroalkyl (meth)acrylate, etc. Hereinbefore, both acrylic acid and methacrylic acid are generally referred to as "(meth)acrylic acid" and both acrylate and methacrylate are generally referred to as "(meth)acrylate".

The process for forming these modified thermoplastic halocarbon copolymers is proposed, for example, in Japanese Patent Publication Nos. 24959/77 and 4207/85, and Japanese Patent Application Laid-Open Nos. 67518/85, 67517/85, 34107/82 and 34108/82.

For the purpose of providing the modified vinylidene halide polymers with improved adhesion to the modified styrene polymers, it is preferred that to the modified vinylidene halide polymers is added an elastomer having a low or no crystallinity such as fluororubber, for example, vinylidene fluoride-hexafluoropropylene copolymer, vinylidene fluoride-pentafluoropropylene copolymer, vinylidene fluoride-chlorotrifluoroethylene copolymer, vinylidene fluoride-tetrafluoroethylene copolymer, vinylidene fluoride-hexafluoropropylene-tetrafluoroethylene copolymer, tetrafluoroethylene-propylene copolymer, and tetrafluoroethylene-perfluorovinyl ether copolymer, chlorinated polyethylene, chlorosulfonated polyethylene, polyurethane rubber, acrylic rubber, chloroprene rubber, nitrile rubber, ethylene-vinyl acetate rubber, polyether rubber, and other elastomers having generally a crystallinity of up to 20% measured by the X-ray diffraction method.

With a view to improving the compatibility and adhesion, in the case of the vinylidena chloride polymers, as the elastomer, preferably use is made of chlorinated polyethylene, polyurethane rubber, acrylic rubber, nitrile rubber, ethylene-vinyl acetate rubber, chloroprene rubber or polyether rubber, and in the case of the vinylidene fluoride polymers, as the elastomer, preferably use is made of vinylidene fluoride series fluororubber such as vinylidene fluoride-hexafluoropropylene copolymer, vinylidene fluoride-hexafluoropropylene-tetrafluoroethylene copolymer, vinylidene fluoride-chlorotrifluoroethylene copolymer, and vinylidene fluoride-pentafluoroethylene copolymer.

With a view of improving the adhesion, the amount of the elastomer when added is 5 to 60 wt %, preferably 10 to 50 wt %, and more preferably 10 to 30 wt %.

The styrene polymers used in the present invention are polymers comprising mainly an aromatic vinyl monomer, for example, styrene or nucleus-substituted styrenes such as methylstyrene, dimethylstyrene, ethylstyrene, isopropylstyrene, and chlorostyrene; and α-substituted styrenes such as α-methylstyrene and α-ethyltyrene, which may, if required, contain a smaller amount of other monomer copolymerizable therewith such as acrylonitrile, methyl methacrylate and vinyl chloride. Illustrative. polymers include polystyrene, high impact polystyrene, acrylonitrile-styrene copolymer, acrylonitrile-butadiene-styrene copolymer, methyl methacrylate-butadiene-styrene copolymer, acrylonitrile-chlorinated polyethylene-styrene copolymer, acrylate-styrene-acrylonitrile copolymer, and a resinous polymer composition of two or more of these homopolymers and copolymers, which may of course contain various inorganic fillers, additives, pigments, etc. that are generally used in this field.

The modified styrene polymers that constitute one layer of the laminate of the present invention are ones that are formed by introducing at least one functional group (b) selected from the group consisting of a carboxyl group, a hydroxyl group and an epoxy group but different from the above-described functional group (a) into the above-mentioned styrene polymers, which may be formed into a composition.

The functional group (b) may be introduced into the styrene polymer by a variety of methods such as: a method wherein a comonomer having the functional group (b) is incorporated by either random, block or graft copolymerization; a method wherein the reactive group in the styrene polymer is reacted with a compound which has the functional group (b) or a compound that will form such a functional group by reaction; and a method wherein the styrene polymer is modified by oxidation (thermal decomposition), hydrolysis or any other appropriate means. The first and third methods are preferred since they allow the functional group (b) to be readily incorporated into the amount of the functional group (b) to be incorporated. Copolymerization is particularly preferred because first a small amount of the functional group (b) is sufficient to provide improved adhesion and, secondly, the polymer to be used for the modification does not experience any great deterioration in its physical properties.

Monomers having a carboxyl group, a hydroxyl group or an epoxy group may be properly selected from among the examples of monomers having the functional group (a).

For the purpose of providing the modifies styrene type polymers with improved adhesion to the modified vinylidene halide polymers, it is preferred that to the modified styrene polymers is added an elastomer having a low or no crystallinity such as styrene copolymer rubber, for example, styrene-butadiene rubber, styrene-isoprene rubber, styrene-chloroprene rubber, styrene-butadiene block copolymer rubber, and styrene-isoprene block copolymer rubber and their hydrogenated products as well as various elastomers having generally a crystallinity of up to 20% measured by the X-ray diffraction method.

With a view to providing improvement in the adhesion and the compatibility with the modified styrene polymer, as the elastomer, preferably use is made of styrene copolymer rubber.

The amount of the elastomer when added is 5 to 60 wt %, preferably 10 to 50 wt % in view of the improvement of the adhesion.

The modified styrene polymer may further contain other thermoplastic polymers such as polyamides and polyesters.

In order to provide high peel strength, it is required that the amounts of the functional groups contained in the modified vinylidene halide polymer and the modified styrene polymer are at least $1 \times 10^{10-3}$ mol/100 g respectively. In order to provide improved moldability and physical properties (e.g., balance between impact resistance and stiffness), the amounts of the functional groups should be up to $3 \times 10^{-1}$ mol/100 g respectively. The amounts of the functional groups are preferably from $5 \times 10^{-3}$ to $2 \times 10^{-1}$ mol/100 g, particularly preferably from $1 \times 10^{-2}$ to $1 \times 10^{-1}$ mol/100 g, respectively. If the amounts of the functional groups are within the stated ranges, the modified polymers may be used after being diluted with unmodified polymers of the same kind.

The functional groups to be incorporated in the modified polymers that constitute opposed layers to form the laminate of the present invention are preferably combined in such a way that they are capable of chemically reacting with each other. Illustrative combinations of the functional groups include (1) a combination of a carboxyl group with an epoxy group or a hydroxyl group; and (2) a combination of an epoxy group with a hydroxyl group.

Particularly preferable combinations are as follows: (1) a modified styrene polymer containing a carboxyl group is laminated with a vinylidene halide polymer containing an epoxy group; and (2) a modified styrene polymer containing an epoxy group is laminated with a vinylidene halide polymer containing a carboxyl group.

The laminate of the present invention may be fabricated by lamination of the two modified polymers in a molten state by th known techniques such as pressing, heat sealing or coextrusion molding. The thickness of each layer is preferably selected from the range of 1 to 1000 μm.

The laminate of the present invention consists of not only the two layers of the modified polymers mentioned above but also may consist of three or more layers including the above-mentioned two layers. Other layers that may serve as substrates include halocarbon polymers such as vinyl chloride polymer, vinylidene chloride polymer, and vinylidene fluoride polymer; styrene polymers such as polystyrene and acrylonitrile-butadiene-styrene polymer; acrylic polymers such as polymethyl methacrylate; o-olefin polymers such as polyethylene and polypropylene; rubbers such as acrylonitrile-butadiene rubber and styrene-butadiene rubber; metals such as aluminum and iron; thermosetting resins such as unsaturated polyesters, epoxy resins and urethane polymers; and engineering plastics such as thermoplastic polyesters, polycarbonates and polyamides.

Specific embodiments of the laminate of the present invention are shown below, wherein the terms "(inner)" and "(outer)" denote the innermost and outermost layers in the laminate, respectively; and PS, PVDF, PVDC, and G.B. stand for, respectively, polystyrene, polyvinylidene fluoride, polyvinylidene chloride and gas barrier resin of polyamide, polyethylene terephthalate, polycarbonate, etc.

(1) (inner) metal/modified PS/modified PVDF (/PVDF) (outer) which may be used in weather-proof steel pipes and weather-proof or corrosion-resistant decorative steel plates;

(2) (inner) (PVDF/)modified PVDF/modified PS/metal (outer) which may be used in corrosion-resistant pipes (as in chemical plants) or as lining on the inner surfaces of tanks (e.g., acid cleaning tanks);

(3) (inner) (PVDF/)modified PVDF/modified PS(/PS or PS foam) (outer) which may be used in hot water supply pipes, containers for chemicals of industrial grades, or bottles for reagents for use in IC fabrication (e.g., etchants and ultrapure water);

(4) (inner) (PVDF/)modified PVDF/modified PS/elastomer (outer) which may be used in pipes in heating systems, medical tubes or oil-resistant tubes (for automotive applications);

(5) (inner) (PS or PS foam/)modified PS/modified PVDF(/PVDF) (outer) which may be used as automotive ceilings, in outdoor pipes or appliance parts;

(6) (inner) (PS/)modified PS/modified PVDC (/PVDC/modified PVDC)/modified PS(/PS) (outer) which may be used as food packaging materials;

(7) (inner) (PS/)modified PS/modified PVDC (/PVDC) (outer) which may be used as food packaging materials or in oil-resistant pipes;

(8) (inner) substrate/modified PS/modified PVDC (/PVDC) (outer) which may be used as food packaging materials;

(9) (inner) G.B./modified PS/modified PVDC (/PVDC/modified PVDC)/modified PS/G.B. which may be used as food packaging materials; and

(10) laminates combined with other substrates which may be used in the field wherein the weather resistance, chemical resistance, uncontaminating property, heat durability, fire retardancy and additive-free high purity intrinsic in PVDF are utilized.

The laminate of the present invention not only can be bonded to these substrate without using an adhesive but also can be bonded to them using an adhesive if required.

As described above, since the laminate of the present invention is high in interlaminar adhesion and has the advantageous properties of thermoplastic halocarbon polymers as well as the properties of styrene polymers, it is expected that the laminate of the present invention may be used not only in industrial items but also in daily needs.

The present invention will now be explained in greater detail with reference to the following examples, but the present invention should not be construed as being limited thereto.

In the following examples, the interlaminar peel strength (interlaminar adhesion) was assessed as follows:

Peel strength: a laminate was cut into 1-cm wide strips, after one end was peeled, the strip was set in an Instron type tester with the sheet of the modified vinylidene halide polymer and the modified styrene polymer being gripped by chucks, and the measurement of the peel strength was effected with a speed of 10 mm/min.

EXAMPLES 1 TO 4, COMPARATIVE EXAMPLES 1 AND 2

A vinyldene fluoride polymer (PVDF; "Kynar 2800" manufactured by Pennwalt Corporation) and a methyl methacrylate-glycidyl methacrylate copolymer (MMA-GMA: with an epoxy content of 0.35 mol/100 g) were blended in the proportions shown in Table 1. The blends were kneaded at 210° C. to obtain modified PVDF compositions. A 0.5-mm thick hot-pressed sheet was formed from each of the thus prepared compositions. On the other hand, styrene-acrylic acid copolymers (St-AA: having acrylic acid contents of 0.014 and 0.069 mol/100 g respectively) and a hydrogenated styrene-butadiene-styrene copolymer rubber (SEBS: Kraton G1652 manufactured by Shell Chemical Co.) were blended in the proportion shown in Table 1 and kneaded at 200° C. to form St-AA compositions. A 0.5-mm thick hot-pressed sheet was formed from each of the thus prepared compositions. Each of the modified vinylidene fluoride polymer composition sheets and each of the modified styrene polymer composition sheets are bonded to form a laminate at 210° C. by compression molding. The 90° peel strength of each laminate was measured and the results are shown in Table 1.

A laminate wherein, instead of the St-AA composition sheet, a polystyrene (PS: Diarex HF 77 manufactured by Mitsubishi Monsanto Chemical Co., Ltd.) sheet was used was evaluated in the same manner and the result is shown in Table 1.

TABLE 1

| Example No. (according to the invention) | Comparative Example No. | Modified vinylidene flouride polymer composition layer (parts by weight) | | | Modified styrene polymer composition layer (parts by weight) | | | | Peel strength (kg/cm) |
|---|---|---|---|---|---|---|---|---|---|
| | | PVDF | MMA-GMA | Epoxy group content (mol per 100 g) | Styrene polymer Type | Amount | SEBS | Acid group content (mol per 100 g) | |
| 1 | | 80 | 20 | 0.070 | St-AA1 | 100 | — | 0.014 | 0.3 |
| 2 | | 70 | 30 | 0.105 | St-AA1 | 100 | — | 0.014 | 0.5 |
| 3 | | 70 | 30 | 0.105 | St-AA2 | 100 | — | 0.069 | 0.7 |
| 4 | | 70 | 30 | 0.105 | St-AA2 | 70 | 30 | 0.049 | 1.0 |

TABLE 1-continued

| Example No. (according to the invention) | Comparative Example No. | Modified vinylidene flouride polymer composition layer (parts by weight) | | | Modified styrene polymer composition layer (parts by weight) | | | | Peel strength (kg/cm) |
|---|---|---|---|---|---|---|---|---|---|
| | | PVDF | MMA-GMA | Epoxy group content (mol per 100 g) | Styrene polymer Type | Amount | SEBS | Acid group content (mol per 100 g) | |
| | 1 | 70 | 30 | 0.105 | PS | 100 | — | 0 | 0 |
| | 2 | 100 | — | 0 | St-AA | 100 | — | 0.069 | 0 |

Note:
ST-AA1 had an acrylic acid content of 0.014 mol/100 g, and St-AA2 had an acrylic acid content of 0.069 mol/100 g.

EXAMPLE 5

400 ml of pure water, 8 g of tribasic calcium phosphate as suspending agent and 0.012 g of sodium dodecylbenzenesulfonate were charged into a 1-l autoclave to serve as an aqueous medium, and 150 g of a vinylidene fluoride polymer (PVDF: "Kynar 2800" manufactured by Pennwalt Corporation) having a particle diameter of 3 to 4 mm were stirred thereinto to be suspended. On the other hand, 1 g of benzoyl peroxide was dissolved into 50 g of methyl methacrylate (MMA) and 50 g of glycidyl methacrylate (GMA), the solution was added to the above-described suspension, and nitrogen was introduced into the autoclave to replace the system in the autoclave with the nitrogen. The inside of the autoclave was heated to 60° C., and the temperature was kept for 3 hours with stirring thereby to impregnate the PVDF particles with the glycidyl methacrylate and methyl methacrylate containing a polymerization initiator.

Then the suspension was heated gradually to 90° C. over the course of 1 hour, and that temperature was kept for 3 hours with stirring to effect the polymerization. After cooling, the contents were taken out and washed with water to obtain 223 g of methyl methacrylate glycidyl methacrylate-modified PVDF (hereinafter referred to as modified PVDF) particles. The methyl methacrylate content and graft copolymerization quantity and the glycidyl methacrylate content and graft copolymerization quantity in the modified PVDF were 16.4 wt %, and 3.3 wt % and 16.4 wt %, and 3.3 wt %, respectively. Therefore, the epoxy group content in the modified PVDF was 0.12 mol/100 g.

After the modified PVDF was kneaded at 210° C., it was formed into a hot-pressed sheet having a thickness of 0.5 mm. On the other hand, a composition of 30 parts by weight of the hydrogenated styrene-butadiene-styrene copolymer rubber and 70 parts by weight of the styrene-acrylic acid copolymer (having an acrylic acid content of 0.069 mol/100 g) used in Example 4 was formed into a hot pressed sheet having a thickness of 0.5 mm. These modified PVDF sheet and modified styrene polymer composition sheet were bonded by compression molding to form a laminate. The 90° peel strength of the obtained laminate was measured to be 1.2 kg/cm.

EXAMPLE 6

70 wt % of a vinylidene chloride polymer and 30 wt % of methyl methacrylate-glycidyl methacrylate copolymer used in Examples 1 to 4 were kneaded at 180° C. to obtain a modified vinylidene chloride polymer.

A 0.5-mm thick sheet of the modified vinylidene chloride polymer and a 0.5-mm thick sheet of the modified styrene polymer composition used in Example 5 were bonded at 180° C. by compression molding, and the 90° peel strength of the obtained laminate was measured to be 1.1 kg/cm.

COMPARATIVE EXAMPLE 3

A sheet of the vinylidene chloride polymer and a sheet of the polystyrene used in Comparative Example 1 were tried to be bonded in the same manner as in Example 6, but they failed to be bonded.

EXAMPLE 7

Examples 1 to 4 are repeated, except that instead of the composition of the vinylidene fluoride polymer and the methyl methacrylate-glycidyl methacrylate copolymer, a vinylidene fluoride-glycidyl methacrylate copolymer is used as modified PVDF. The peel strength is measured and found to be the same as in Examples 1 to 4.

EXAMPLE 8

Example 5 is repeated, except that instead of the vinylidene fluoride polymer wherein methyl methacrylate and glycidyl methacrylate are grafted, a vinylidene fluoride-glycidyl methacrylate copolymer is used as modified PVDF. The peel strength is measured and found to be the same as in Example 5.

EXAMPLE 9

Example 6 is repeated, except that instead of the composition of the vinylidene chloride polymer and the methyl methacrylate-glycidyl methacrylate copolymer, a vinylidene chloride-glycidyl methacrylate copolymer is used as modified PVDF. The peel strength is measured and found to be the same as in Example 6.

EXAMPLE 10

A laminate prepared from a vinylidene chlorideacrylic acid copolymer and a styrene-glycidyl methacrylate copolymer or a styrene polymer grafted with glycidyl methacrylate exhibits a strong peel strength.

EXAMPLE 11

A laminate prepared from a vinylidene fluoride-2-hydroxyethyl methacrylate copolymer and a styrene polymer wherein maleic anhydride is graft-copolymerized exhibits a strong peel strength.

EXAMPLE 12

A laminate prepared from a vinylidene chloride-2-hydroxyethyl methacrylate copolymer and a styrene-glycidyl methacrylate copolymer or a styrene polymer grafted with glycidyl methacrylate exhibits a strong peel strength.

While the invention has been described in detail and with reference to specific embodiments thereof, it will be apparent to one skilled in the art that various changes and modifications can be made therein without departing from the spirit and scope thereof.

What is claimed is:

1. A thermoplastic halocarbon polymer laminate which comprises a modified vinylidene halide polymer containing at least one functional group (a) selected from the group consisting of a carboxyl group, a hydroxyl group, and an epoxy group and a modified styrene polymer containing at least one functional group (b) which is selected from the above-defined group but which differs from the functional group (a), with the contents of the functional groups (a) and (b) being $1 \times 10^{-3}$ to $3 \times 10^{-1}$ mol/100 g respectively.

2. A laminate as claimed in claim 1, wherein said vinylidene halide polymer is a vinylidene fluoride polymer or a vinylidene chloride polymer.

3. A laminate as claimed in claim 1, wherein the contents of the functional groups (a) and (b) are $5 \times 10^{-3}$ to $2 \times 10^{-1}$ mol/100 g respectively.

4. A laminate as claimed in claim 1, wherein the contents of the functional groups (a) and (b) are $1 \times 10^{-2}$ to $1 \times 10^{-1}$ mol/100 g respectively.

5. A laminate as claimed in claim 1, wherein the functional group (a) is a carboxyl group and the functional group (b) is an epoxy group, or the functional group (a) is an epoxy group, and the functional group (b) is a carboxyl group.

6. A laminate as claimed in claim 1, wherein the functional group (b) is a carboxyl group.

7. A laminate as claimed in claim 1, wherein said modified vinylidene halide polymer contains 5 to 60 wt % of an elastomer.

8. A laminate as claimed in claim 1, wherein said modified styrene polymer contains 5 to 60 wt % of an elastomer.

* * * * *